United States Patent
Tomchick et al.

(10) Patent No.: US 7,954,218 B2
(45) Date of Patent: Jun. 7, 2011

(54) SELF-ALIGNING COLLAR SWAGING SYSTEM FOR AIRPLANE PANEL BOLTS

(75) Inventors: Scott C. Tomchick, Lynnwood, WA (US); Peter B. Zieve, Seattle, WA (US); Carter L. Boad, Lynnwood, WA (US)

(73) Assignee: Electroimpact, Mulkilteo, WA (US)

( * ) Notice: Subject to any disclaimer, the term of this patent is extended or adjusted under 35 U.S.C. 154(b) by 1053 days.

(21) Appl. No.: 11/332,192

(22) Filed: Jan. 12, 2006

(65) Prior Publication Data
US 2007/0157453 A1    Jul. 12, 2007

(51) Int. Cl.
*B21D 39/00* (2006.01)
*B23P 11/00* (2006.01)
*B23P 21/00* (2006.01)
*B25C 5/02* (2006.01)

(52) U.S. Cl. .............. 29/243.5; 29/505; 29/715; 29/718; 227/112; 227/119

(58) Field of Classification Search ............... 29/243.53, 29/243.54, 283, 505, 524.1, 525.06, 709, 29/715, 718, 243.5; 227/119, 101, 100, 51, 227/112
See application file for complete search history.

(56) References Cited

U.S. PATENT DOCUMENTS

| | | | | |
|---|---|---|---|---|
| 3,212,174 A * | 10/1965 | Wonneman | ............... | 29/709 |
| 4,170,890 A * | 10/1979 | Kojima | ............... | 72/359 |
| 5,437,094 A * | 8/1995 | Zieve et al. | ............... | 29/718 |
| 5,452,505 A * | 9/1995 | Gasser | ............... | 29/243.526 |
| 5,779,127 A * | 7/1998 | Blacket et al. | ............... | 227/107 |
| 6,253,448 B1 * | 7/2001 | Zieve et al. | ............... | 29/709 |
| 6,592,015 B1 * | 7/2003 | Gostylla et al. | ............... | 227/112 |
| 7,293,339 B2 * | 11/2007 | Mercer et al. | ............... | 29/243.522 |

* cited by examiner

*Primary Examiner* — David P Bryant
*Assistant Examiner* — Alexander P Taousakis
(74) *Attorney, Agent, or Firm* — Clark A. Puntigam; Jensen & Puntigam, P.S.

(57) ABSTRACT

A system and method for feeding collar members to an attachment system for assembly of aircraft and similar large scale mechanical assemblies. Collars are fed sideways along a tube having a rectangular internal cross-section to a collar pathway defined by an clamp fork and swaging ram combination. The collar pathway is curved to present the collar to a receiving element mounted on a swaging die in a proper orientation relative to an attachment bolt which is moved through an opening in the workpiece and then through the collar. As the bolt is moved into the collar, the collar, receiving element and swaging die move together laterally to come into alignment with the bolt.

7 Claims, 10 Drawing Sheets

SELF-ALIGNING COLLAR SWAGING SYSTEM FOR AIRPLANE PANEL BOLTS

TECHNICAL FIELD

This invention relates generally to attachment systems and methods of manufacture of large scale assemblies, such as the attachment of panels and stringers in the manufacture of commercial aircraft, and more specifically concerns a system for presenting collars to attachment bolts for swaging thereon or during the attachment/manufacturing process.

BACKGROUND OF THE INVENTION

In the manufacture of large commercial aircraft as well as other similar large mechanical assemblies, various parts of the assemblies are secured together with bolts, typically lock bolts, with collar members being swaged on to the ends of the bolts for secure attachment of the parts. Typically, the collar members, which are small hollow cylindrical sections of appropriate internal diameter relative to the bolt, sometimes having a flange, are moved from a storage unit such as a bin or a cartridge, to the exposed end of the bolt, which extends through registered openings in the two parts (workpieces) to be joined, which have been previously clamped together.

After the collar is moved onto the exposed end of the bolt, it is swaged thereon for secure attachment of the clamped workpieces. In this process, collars are typically delivered to a collar gripper assembly which positions the collar in alignment with the end of the bolt and the swaging die. Such systems are commonly used throughout the industry. Two examples are shown in U.S. Pat. No. 6,253,448 and U.S. Pat. No. 5,437,094, both of which are owned by the assignee of the present invention. Collar gripper systems have various configurations, depending upon the configuration of the collar and the two parts to be joined. In some cases, collars are delivered directly on a straight line to the end of the bolt, while other systems involve an offset arrangement, because one part has a configuration which prevents a straight line collar delivery path.

Figure 1A:
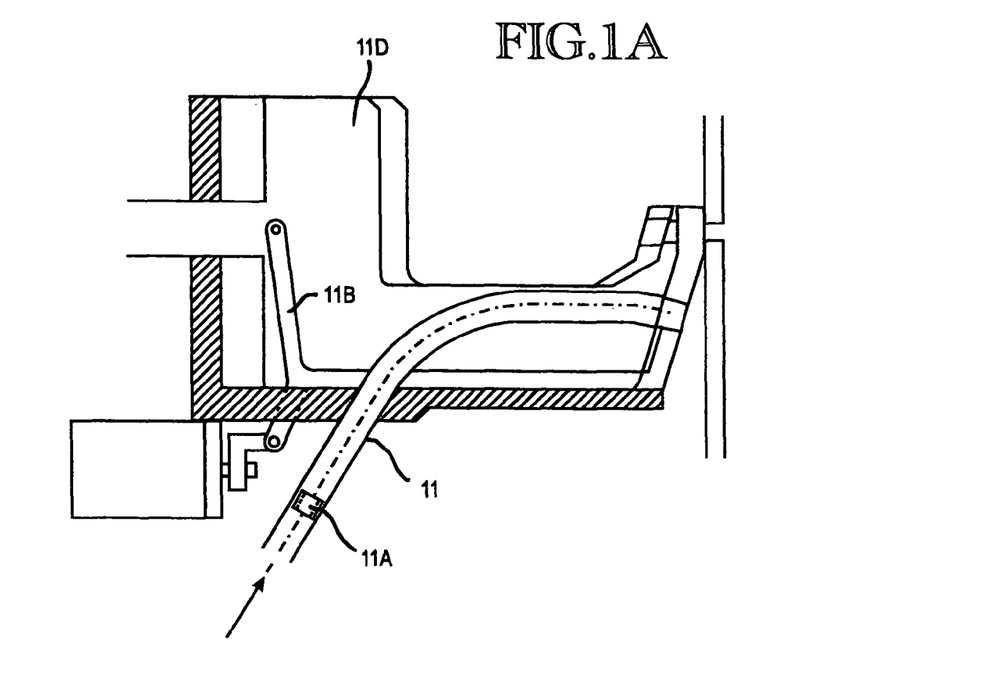
FIGS. 1A-1B and 2A-2B are cross-sectional views of prior art collar feed systems.
Figure 1B:
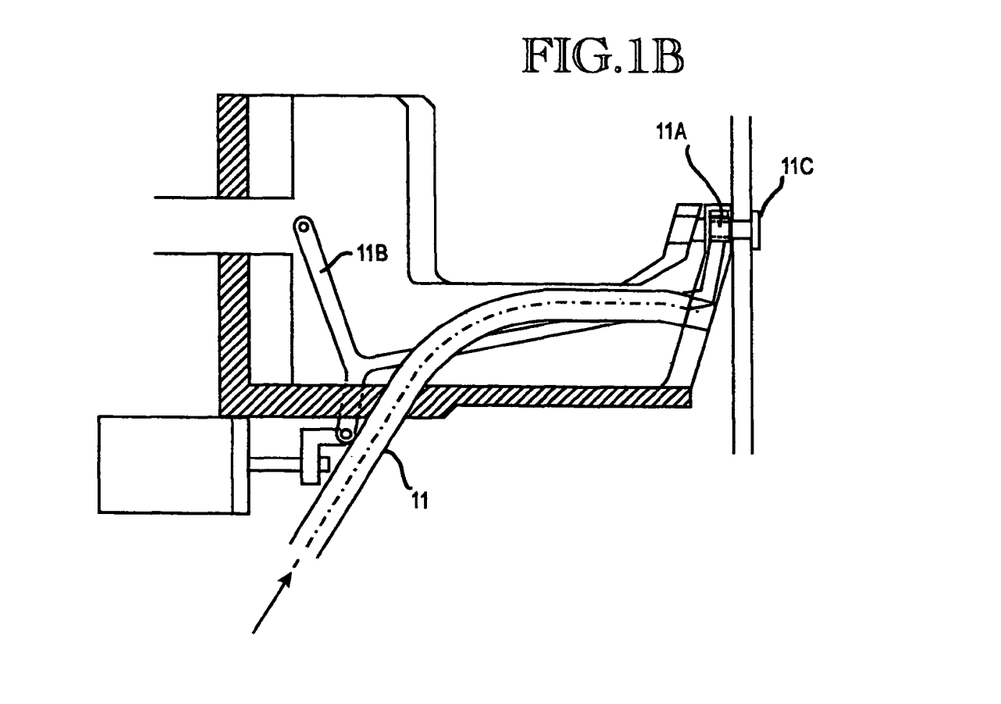

One commercial collar feed system using a gripper apparatus is shown in FIGS. 1A and 1B. This system includes a feed tube 11 in which a collar 11a is fed with its longitudinal opening parallel with the direction of the feed tube. A pivoting collar gripper member 11b grips the collar as it exits from the feed tube and then pivots the collar into position, as shown in FIG. 1B, at which point a bolt 11c is driven through the collar. The gripper is then retracted and the collar is swaged onto the bolt with a swaging die by action of the ram 11d, in well-known, conventional fashion. In this system, the gripper and the swaging die must be accurately aligned with the opening in the workpiece through which the bolt extends.

Figure 2A:
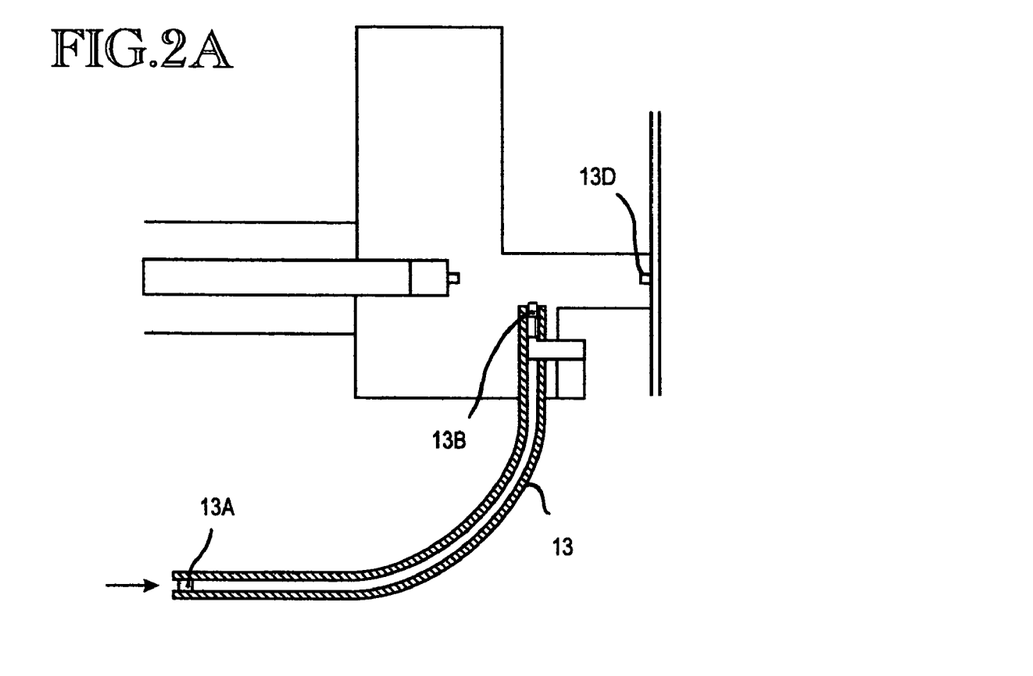
Figure 2B:
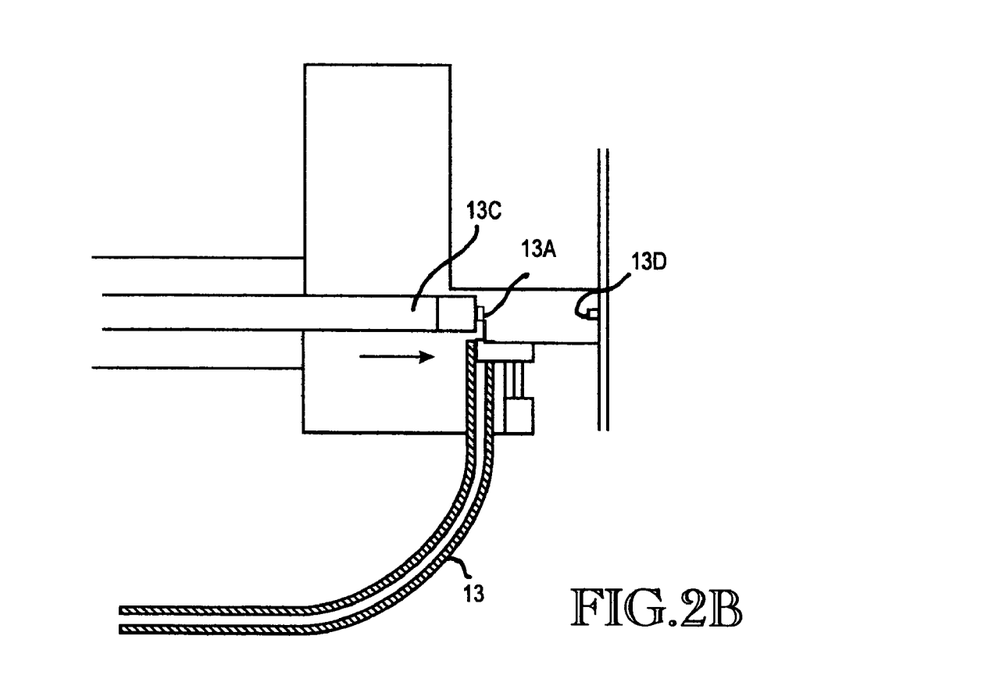

Another commercial product is shown in FIGS. 2A and 2B. In this system, a collar 13a is delivered through a feed tube 13, with the collar opening being perpendicular to the length of the feed tube. The collar is fed to a collar gripper 13b, which grips the exterior surface of the collar, moves the collar upwardly, into a position where the tool die 13c picks up the collar 13 and, following retraction of the gripper 13b, moves the collar onto a bolt 13d, where it is swaged in well-known, conventional fashion.

These known collar gripper systems are, however, often complex, expensive and can wear out or break. Also, each size of collar, and there are typically several different sizes used on a particular aircraft or other large scale assembly, require different collar gripper systems and an associated swaging system. Another disadvantage to gripper systems in general is the difficulty in accurately aligning the bolt, the collar and the die. Even small misalignments can result in a collar attempting to move onto a bolt in a tipped orientation, causing difficulties in the swaging process and/or delays in manufacturing due to the necessity of removing a damaged or misaligned collar, which is time-consuming.

Hence, a system by which a collar can be accurately delivered to placement on the bolt used in manufacture of large scale mechanical assemblies, while maintaining accurate alignment between the bolt, the collar and the die, without the disadvantages of a collar gripping system, would be a significant advantage over existing gripping systems.

SUMMARY OF THE INVENTION

Accordingly, one aspect of the present invention is a collar feed system for use with fasteners in the manufacture of large mechanical assemblies, comprising: a collar transport system to move a collar transversely therealong to a collar swaging die; and a receiving element at the collar swaging die, configured to contact an outside surface of the collar and position it relative to the swaging die, wherein the receiving element is fixedly connected to and aligned with the collar swaging die in such a manner that when a collar is stopped by the receiving element it is approximately on axis with the swaging die.

Another aspect of the present invention is a collar swaging system for use with fasteners in the manufacture of large mechanical assemblies, in which collars are transported to a collar die, comprising: a receiving element at the collar die for stopping the transported collar, wherein the collar is stopped relative to the die by the receiving element and wherein the die is mounted such that the die is moveable longitudinally toward the workpiece and also slightly laterally, such that when the collar is positioned against a workpiece by movement of the die and a fastener is thereafter moved into the positioned collar through an opening in the workpiece, the resulting action of the fastener on the collar causes the collar and the die to move into alignment with the fastener, pressure from the die on the collar against the workpiece preventing pivoting of the collar relative to the longitudinal axis of the fastener.

A further aspect of the present invention is a delivery system for collars used with attachment members in the manufacture of large scale mechanical assemblies, comprising: a storage cartridge for collar members, the cartridge comprising an elongated tube-like member having a rectangular cross-sectional opening therealong, wherein the collars are stored in the cartridge in a sideways orientation such that the collar openings extend laterally across the cartridge instead of longitudinally therealong; a collar pathway assembly into which the collars are moved in the sideways orientation from the cartridge, wherein the collar pathway defined in the collar pathway assembly is curved so that as collars are moved therealong, they exit to a selected position in substantial alignment with the center axis of a bolt on which they will be swaged, without use of a collar gripper assembly for moving the collar; and an air transport system for moving collars from the cartridge to the selected position.

A still further aspect of the present invention is a method for successively feeding collars for swaging onto attachment members in the manufacture of large scale mechanical assemblies; comprising the steps of: moving a collar along a collar pathway in a sideways orientation to a receiving member mounted on a periphery of a swaging tool, wherein the collar is presented in alignment with the swaging tool, wherein the receiving member is fixed in position to the swaging tool and contacts an outside surface of the collar; and moving the collar against a surface of the workpiece or coupon adjacent to openings in the workpiece or coupon, which are in registry, wherein when an attachment bolt is moved through openings in the workpiece to be joined or a coupon and then into the collar, the receiving member and the swaging die move slightly into alignment with the centerline of the bolt as it is moved into the collar.

BEST MODE FOR CARRYING OUT THE INVENTION

Figure 4:
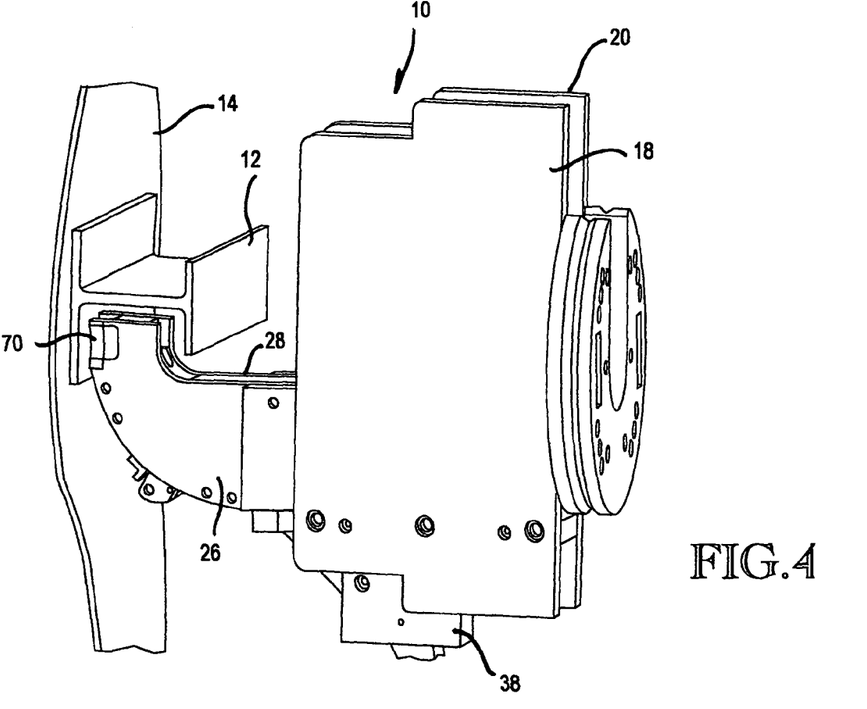
FIG. 4 is an elevational view showing the system of FIG. 3 in a clamp-up position involving two aircraft parts to be secured together with a bolt/collar combination.

FIG. 4 shows a collar delivery system used in the manufacture of large scale assemblies, such as commercial aircraft. The collar delivery system is partially defined by a clamp fork/ram combination which, after a collar has been positioned onto a bolt, swages the collar onto the bolt. The clamp fork/ram combination 10 in FIG. 4 is configured to secure an aircraft stringer 12 to a panel 14. The stringer 12 is secured to the panel 14 via a large number of closely spaced bolt/collar combinations. In operation, the clamp fork/ram combination moves automatically along the stringer, securing, in sequence, successive collars onto the exposed ends of successive bolts. Such a clamp fork/ram combination can be used for a variety of applications besides the manufacture of aircraft. Aircraft parts are shown in this application for illustration of one desired use. The clamp fork/ram combination 10 is configured to incorporate a collar delivery system which delivers collars to be positioned and swaged onto a bolt without the necessity of a separate gripping system.

Figure 3:
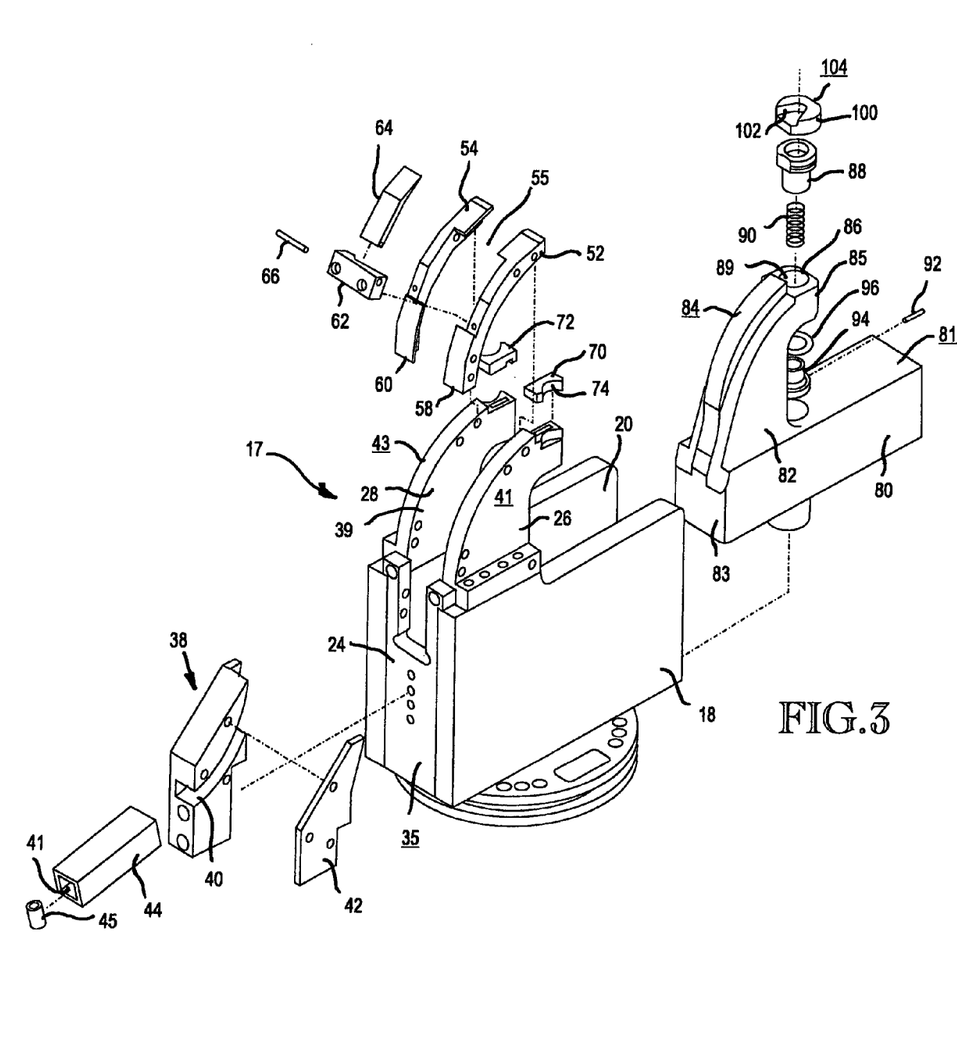
FIG. 3 is an exploded view of the gripperless collar delivery system of the present invention.

FIG. 3 is an exploded view of the collar delivery system and the clamp fork/ram combination 10. The clamp fork assembly portion 17 includes two identical, spaced backplates 18 and 20 which extend parallel from a rectangular fork base element 24. Plates 18 and 20 are separated by approximately 1.5 inches in the embodiment shown. Two front forks 26 and 28 are secured to edges 30 and 32 of the backplates at the lower ends thereof, the front forks having outer edges 31 and 33 which are curved over approximately a 90° angle. The front forks are also parallel and have the same spacing as backplates 18 and 20, so that, in effect, they are extensions of backplates 18 and 20.

Secured to surface 35 of fork base element 24 is a lower solid collar feed member 38 which has a curved slot 40 extending therethrough from a rear end to a forward end thereof. Feed member 38 includes a removable side cover 42. The slot 40 opening at the forward end of the feed member 38 mates with a cavity 39 between front forks 26 and 28. Connected to the opposing end of slot 40 in feed member 38 is a length of plastic tubing 44, which has a rectangular internal opening 41. Tubing 44 is connected to or a part of a source of collars such as a collar bin or a collar cartridge. The collar cartridge 45 (FIG. 11) in one embodiment is a rolled up length of rectangular tubing 44, fitted into a portable case 49. Cartridge 45 could include several hundred collars in the tubing 47. A single collar 45 is shown relative to a section of tubing 44 in FIG. 1, as it is about to enter the feed member 38.

Attached to the two curved edge surfaces 41 and 43 of the two front forks 26 and 28 are two collar tracks 52 and 54, which match the curvature of the front forks. When secured to edge surfaces 41 and 43 of the front forks, the collar tracks 52 and 54 abut each other along a midline between the two front forks 26 and 28, except for a short open portion 55. The collar tracks 52, 54 are secured to the front forks 26, 28 by means of screws, pins or other attachment elements.

Positioned across the two collar tracks 52 and 54, a short distance from the lower ends 58 and 60 thereof, is a hinge block 62 which is rectangular in configuration and secured to the two collar tracks 52 and 54, typically by screws. Mounted in hinge block 62 is a hinge pin 66, on which is rotatably mounted an ejection door 64 which is capable of swinging inwardly between the front forks 26 and 28 about hinge pin 66. Otherwise, it is positioned adjacent the opening 55 between collar tracks 52 and 54, closing off opening 55.

At the forward ends of edges 41 and 43 of front forks 26 and 28, adjacent the forward ends of the collar tracks 52 and 54, are mounted a pair of opposed clamp pads 70 and 72. The clamp pads 70 and 72 are configured to come against the near workpiece (e.g. stringer 12 in FIG. 4) when the clamp fork/ram combination is in its clamp-up position, as shown in FIG. 4. The clamp pads 70 and 72 are typically made from steel and may take various configurations. In the embodiment shown, the clamp pads are rectangular, with curved outer edge surfaces 74.

The swaging ram assembly portion of the clamp fork/ram combination is referred to generally at 78. It includes a rectangular ram base portion 80, and an extension portion 82 which extends from surface 81 of the base portion. Extension portion 82 includes a curved outer surface 84 which begins at rear edge 83 of base portion 80. Base portion 80 fits between back plates 18 and 20 while extension 82 fits between front forks 26 and 28 in such a manner that curved surface 84 of extension portion 82, portions of the inner surfaces of front forks 26 and 28 and the inner surfaces of collar tracks 52 and 54 form a curved cavity feedpath, including cavity 39, into which collars are fed from the forward end of feed member 38. The cavity/feedpath ends at a point where the collar is in alignment with the swaging die.

At a forward end 85 of extension portion 82 is an opening 86 into which a swaging die 88 for the collar is positioned. Swaging die 88 is configured relative to the collar so as to perform the well known swaging operation, which is explained in more detail below. Positioned in an opening 89 in swaging die 88 is a spring member 90 which is retained by a pin 92 in a die retaining element 94, which in turn is fixedly mounted in ram base 80. The outward end 92 of spring 94 is flush with the face 93 of swaging die 88. The spring prevents rotation of the collar when it moves into and is in position in sleeve 100.

In some systems, an O-ring 96 is positioned between swaging die 88 and the fixed die retainer 94. There is a clearance between the swaging die 88 and opening 86, which permits the swaging die to move slightly laterally to accommodate slight initial misalignment between the bolt and collar and the swaging die when the bolt is driven through the openings in the workpiece parts and the collar, as explained in more detail below. Thereafter, due to the "sticky" (striction) effect of the O-ring 96, the swaging die remains in its last position, with the collar and swaging die being in alignment with each bolt in successive fastening operations. The O-ring arrangement is well suited for yoke-type machines, since the alignment stays the same from operation to operation. For separate, opposing robot arrangements, in which the alignment can vary, the O-ring could be eliminated or replaced by an elastic member/assembly that would return swaging die 88 to the center of opening 86 in extension portion 32 after each collar swaging operation, since each fastening operation using dual robots will require a separate alignment function.

Mounted on the periphery of swaging die 88 is a soft elastomeric centering sleeve 100 which has a V-shaped notch 102 molded into its forward face 104. The collar is centered relative to the swaging die 88 when the collar is positioned in the V-shaped notch portion 102.

FIGS. 4-12 show the sequence of steps in the operation of the collar feed system. Referring to FIG. 4, the clamp fork/ram combination 10 is shown in a clamp-up mode, clamping aircraft stringer 12 to panel 14. FIG. 4 shows an offset configuration of the clamp fork/ram combination, due to the particular configuration of the stringer 12. The same clamp fork/ram combination can be used, however, even if there is no requirement of an offset. This reduces the number of different clamp fork/ram combinations required for different assembly parts. This is an advantage of the overall system shown and described herein. In clamp-up, clamping pads 70 and 72 on the clamp fork assembly contact the surface of the stringer 14 or other workpiece and hold the stringer against the panel.

Figure 5:
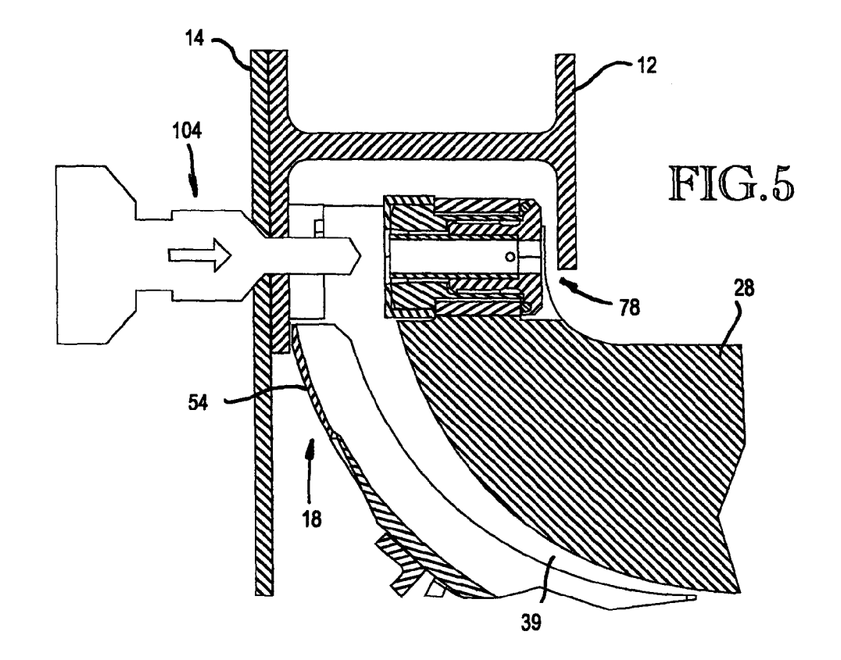
FIG. 5 is a cross-sectional view showing a drilling step in the attachment process using the system of FIG. 3.
Figure 6:
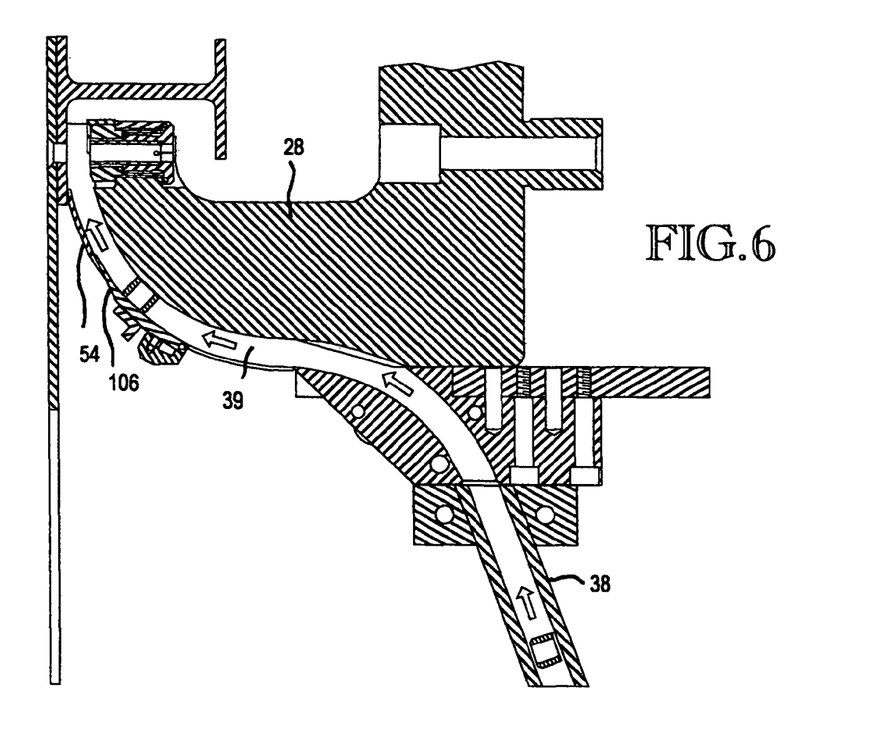
FIG. 6 is a cross-sectional view showing the delivery of a collar to the vicinity of a bolt, which is inserted through a drilled opening in the parts to be joined.

FIG. 5 shows the next step in the process, in which the ram assembly 78 is pulled back away from stringer 12, while the clamp fork assembly 17 remains in place. A countersink (it could be straight as well) opening 111 (FIG. 6) is then drilled through the workpiece parts, i.e. panel 14 and the stringer 12, by a drilling assembly 104, typically under automatic control. In the next step, shown in FIG. 4, ram assembly 78 is advanced a slight distance, although there remains a clearance (gap) for presentation of a collar 106 between the sleeve 100 and the near workpiece. The path of collar 106 is through a feed member 38 and then cavity 39, which is defined by the two spaced front forks 26 and 28, the curved surface 84 of extension 82 of the ram assembly, and the two adjacent collar tracks 52 and 54.

Figure 7:
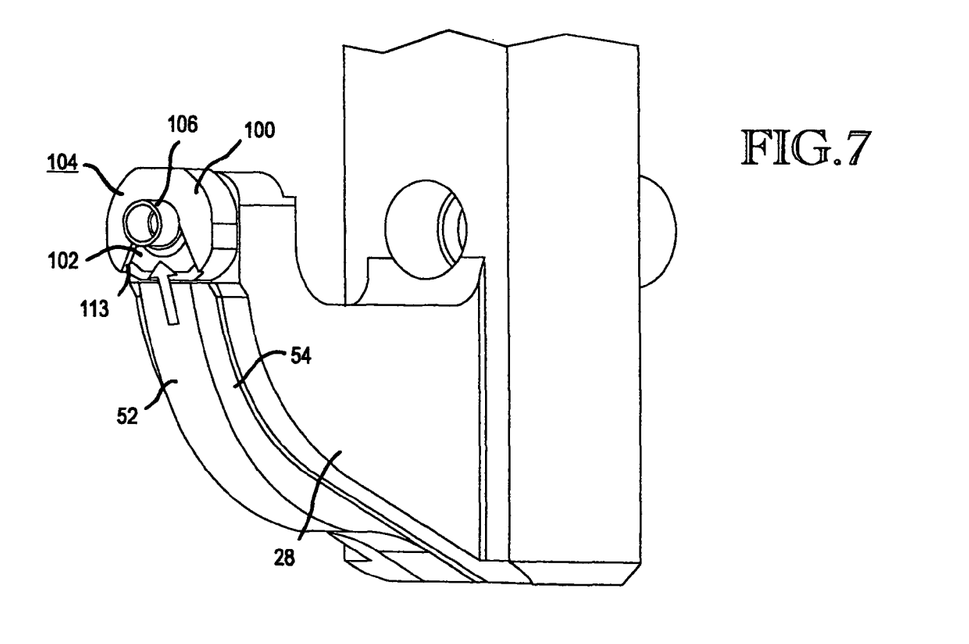
FIG. 7 is a perspective view showing the forward portion of the system of FIG. 3 with a collar therein.

As shown in FIG. 7, collar 106 is fed transversely (sideways) into notch 102 defined in sleeve 100. This accurately locates the collar for swaging onto the bolt. The spring 90 prevents the collar from rotating (tilting), maintaining it in a sideways position. The sideways, i.e. transverse, movement of the collar through the collar feed system results in the reliable feeding of collars without requiring feed fingers or grippers. More than one fastener diameter can typically be fed through one such feed assembly arrangement. Further, as discussed above, offset and straight stringer assembly geometries can be accommodated by use of the same feed system/clamp fork assembly.

The curved path of the feed system, as shown, orients the collar so that at the end of its feed trip, its central axis is aligned with the axis of the swaging die. The sideways (transverse) orientation of collar 106 through the feedpath results in the collar being reliably presented to the die, and provides more collar surface area for reliable movement of the collar through the feed system by compressed air, as opposed to a conventional endwise orientation, with the collar opening parallel with the feedpath. Higher speeds and less air flow are possible with the present arrangement. Relatively small air pressures are sufficient.

The plastic sleeve 100 acts as a precision stop for the collar 106. The sleeve, as indicated above, rides on the swaging die but does not interfere with the swaging process. The thickness of the sleeve, dimension 113 is approximately 0.05 inches. The thickness can vary to some extent. This thickness does not interfere with the swaging process. Sleeve 100 is made of polyurethane, so it can compress slightly and spring back. Sleeve 100 is simple, inexpensive and typically lasts through thousands of cycles, besides being easy to change when necessary. Since sleeve 100 is mounted on the swaging die, the collar, when located in notch 102, is presented directly and accurately on the swaging die, regardless of the stringer configuration, in alignment with the axis of the swaging die. Further, the arrangement permits at least two different diameters of collars to be accommodated within a single collar feed pathway. The arrangement is not critical to one collar size. The sleeve is important to the proper operation of the collar feed system. The process up to this point is sometimes referred to as "pre-pinch".

Figure 8:
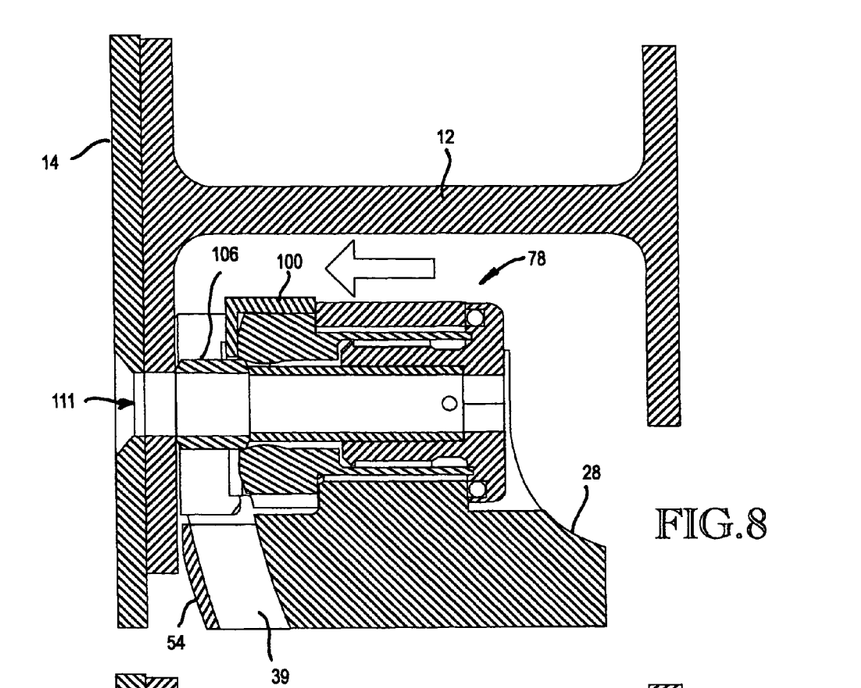
FIG. 8 is a cross-sectional view showing the placement of a collar against the opening in the workpiece.

In the next step, shown in FIG. 8, the ram assembly moves towards the workpiece, capturing ("pinching") collar 106 against the near workpiece, i.e. stringer 12. The collar is still, at this point, held in the V-notch 102 of sleeve 100. The position of the swaging ram is then measured by a linear potentiometer (not shown). If the collar 106 is damaged or out of length tolerance then it can be ejected, as discussed more in detail below.

Figure 9:
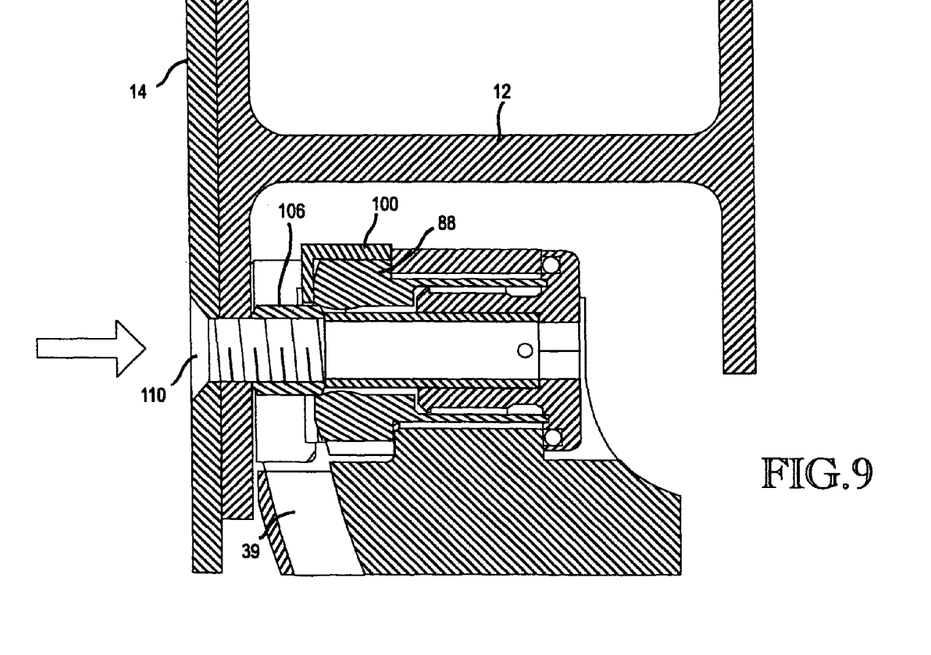
FIG. 9 is a cross-sectional view showing a bolt being driven through the openings in the parts and through the collar.

Referring now to FIG. 9, a bolt 110 is driven through the countersink opening 111 (FIG. 8) in the workpiece portions into collar 106. The tapered free end of the bolt 110 aligns the collar 106 and the longitudinal axis of the die to the bolt axis.

As indicated above, the clearance between bolt 88 and opening 86 permits approximately 0.8 mm of radial (lateral) movement of the swaging die, which is referred to as a "sticky" die, as explained below. After die 88 is first installed on the ram assembly, at the start of successive attachment operations involving the swaging of successive collars onto successive bolts along a section of the workpiece, a first bolt is driven though the hole, engaging the collar which is mounted on the die 88, such that it is trapped and cannot rotate. This first bolt process, to accomplish alignment of the system, is done either in the workpiece itself or more likely in a coupon separate from the workpiece, prior to beginning attachment operations on the workpiece.

The bolt end is typically somewhat chamfered. On engaging the collar, the chamfered end centers the collar, with the die shifting slightly, as necessary, with the collar, accommodating to the center line of the bolt. This action occurs because the action of the bolt moving into the collar overcomes the friction of the O-ring. The bolt, the collar and the die are now all aligned. It would be undesirable to force this centering during every operation, through the use of a "loose" die. The alignment process in the worst case could cause marring of the coating on the inside edge of the collar surface adjacent the panel. Accordingly, doing an initial alignment on a test piece (coupon) is desirable.

The die and collar maintain this aligned position throughout the remainder of attachment operations (successive bolts and collars) along the stringer, because the friction of the O-ring maintains the alignment. This arrangement, in particular, the collar mounted on the die, with the die and the collar thereon free to move slightly during an initial operation because of the O-ring, results in an initial alignment between the die, the collar and the center line of the bolt. The function of the O-ring then maintains the alignment. This is a significant feature of the system shown herein. The above description is for a yoke machine, with the tools on both sides of the workpiece mounted in a single assembly. With such a machine, an initial (one-time) alignment accomplished with the "sticky" die tends to hold the alignment from fastening operation to operation. However, with dual, separate machines, the O-ring may not be desirable. Rather, a "return to center" spring arrangement may be preferable, to bring the die back to a center position after each operation, where alignment of the system is accomplished prior to swaging for each fastening operation/cycle.

Figure 14A:
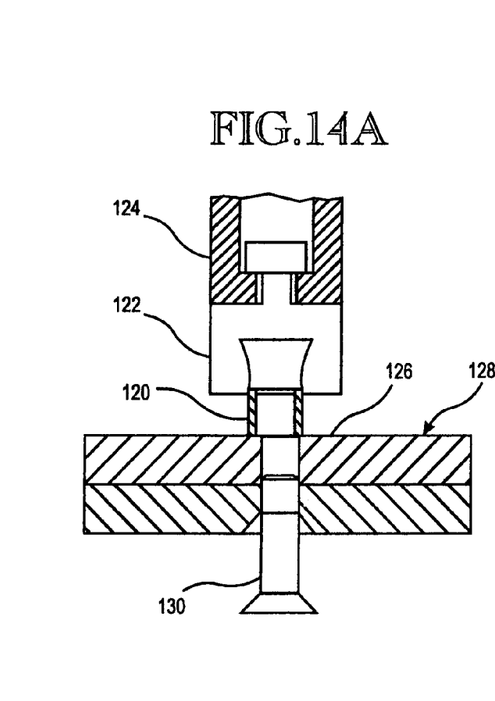
FIGS. 14A-14C are cross-sectional views of a collar and die being aligned with the axis of a bolt as the bolt is moved into the collar.
Figure 14B:
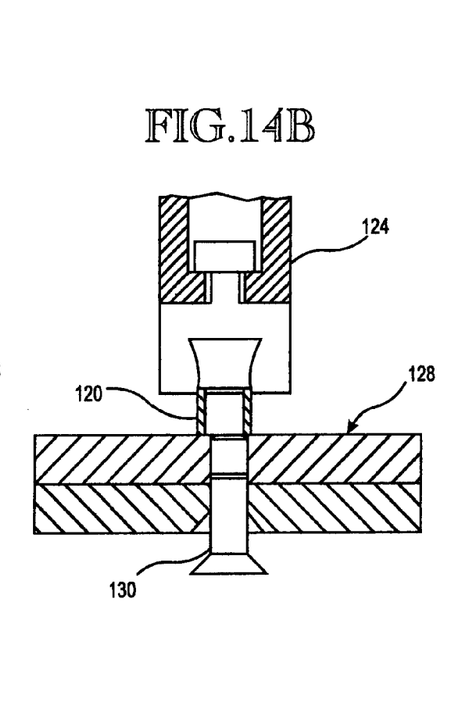
Figure 14C:
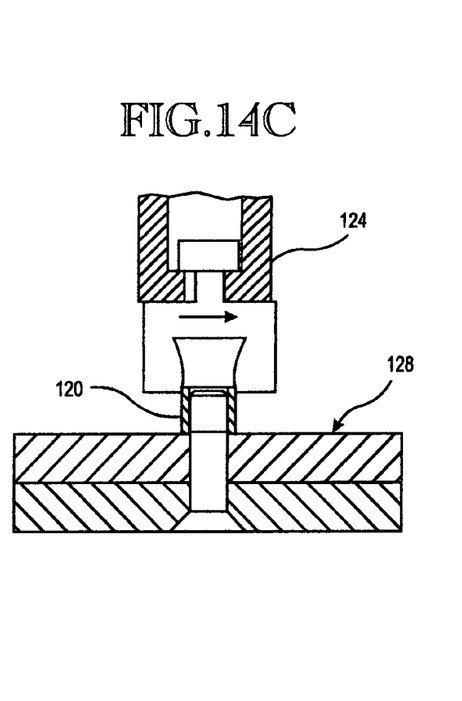

FIGS. 14A-14C show in more detail the sequence of a part of the fastening operation in which a collar and a die come into alignment with a fastener (bolt) as the fastener is driven into the collar through an opening in the workpiece. In FIG. 14A, a collar 120 has been moved into position into alignment with die 122, which is connected to the ram 124. For ease of explanation, the receiving element discussed above present on the die which stops the collar and holds it in position relative to the die is not shown. Note that, for illustration in FIG. 14A, collar 120 and die 122 are slightly off axis relative to opening 126 in workpiece 128, into which a bolt 130 has been partially inserted from the opposing side of the workpiece 128. Typically, bolt 130 will have a chamfered portion 136 at its tail end. In FIG. 14A, collar 120 has been moved toward the workpiece 128 so that it is positioned (pinched) against the surface of the workpiece by action of the die and the ram.

In FIG. 14B, bolt 130 is shown driven partially through the workpiece toward collar 120 such that the chamfered portion 136 just engages the inside surface of the collar, which as indicated above is initially slightly off axis from the opening 126 through the workpiece.

In FIG. 14C, bolt 130 has been fully driven through the opening 126 and into the collar. As this action occurs, collar 120 and die 122 are driven slightly laterally relative to the workpiece and the ram, as permitted by the clearance between the die and the opening in the forward portion of the ram 124 in which the die is mounted. In this new position, the die and the collar are now aligned with the opening in the workpiece and the bolt axis, so that subsequent swaging of the collar onto the bolt by the die can proceed properly, without damaging or tilting/rotating the collar.

Figure 10:
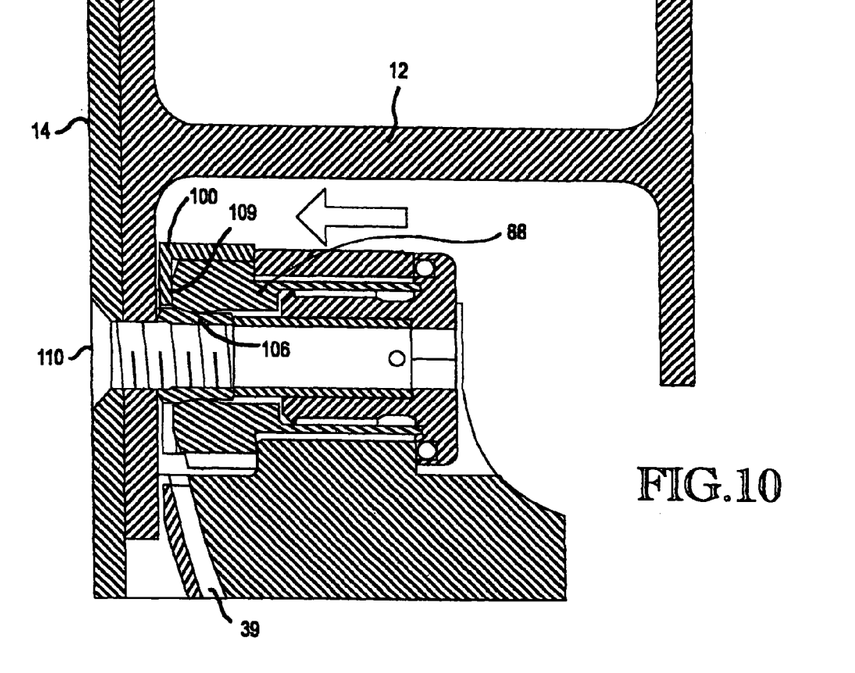
FIG. 10 is a cross-sectional view showing the collar being swaged onto an exposed end of the bolt.

In FIG. 10, the ram assembly is moved forward, such that swaging die 88 swages collar 106 onto the end of bolt 110. The sleeve 100 simply moves over the surface of the collar, such that the forward end 109 of the sleeve 100 comes close to the surface of the stringer 12 at the conclusion of the swaging process.

Figure 11:
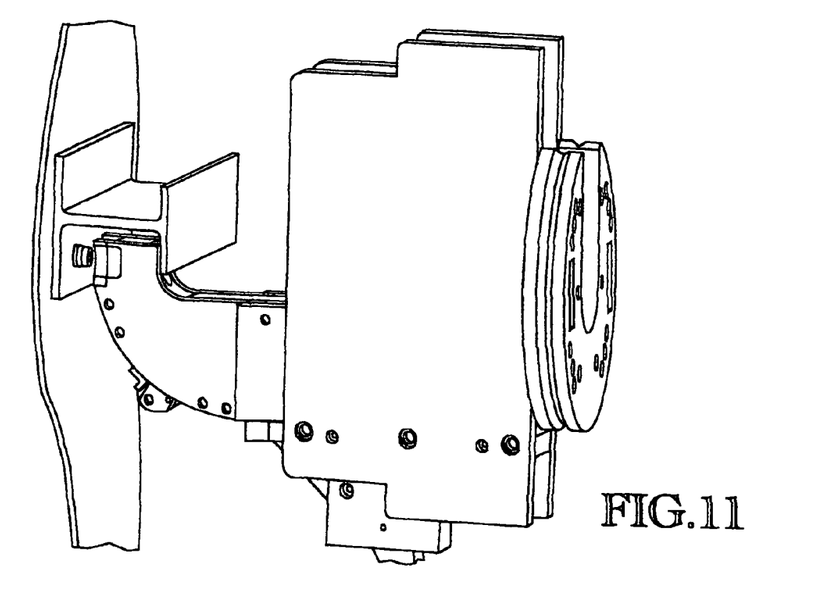
FIG. 11 is an elevational view showing the swaging die being removed from the collar.

In FIG. 11, the ram assembly 78 is moved back, taking the die 88 and sleeve 100 with it, stripping die 88 off of the swaged collar. The clamp fork assembly 17 is also moved back away from the workpiece to an unclamped position. The entire assembly is then ready to move to the next bolt position along the assembly for the next attachment operation.

Figure 12:
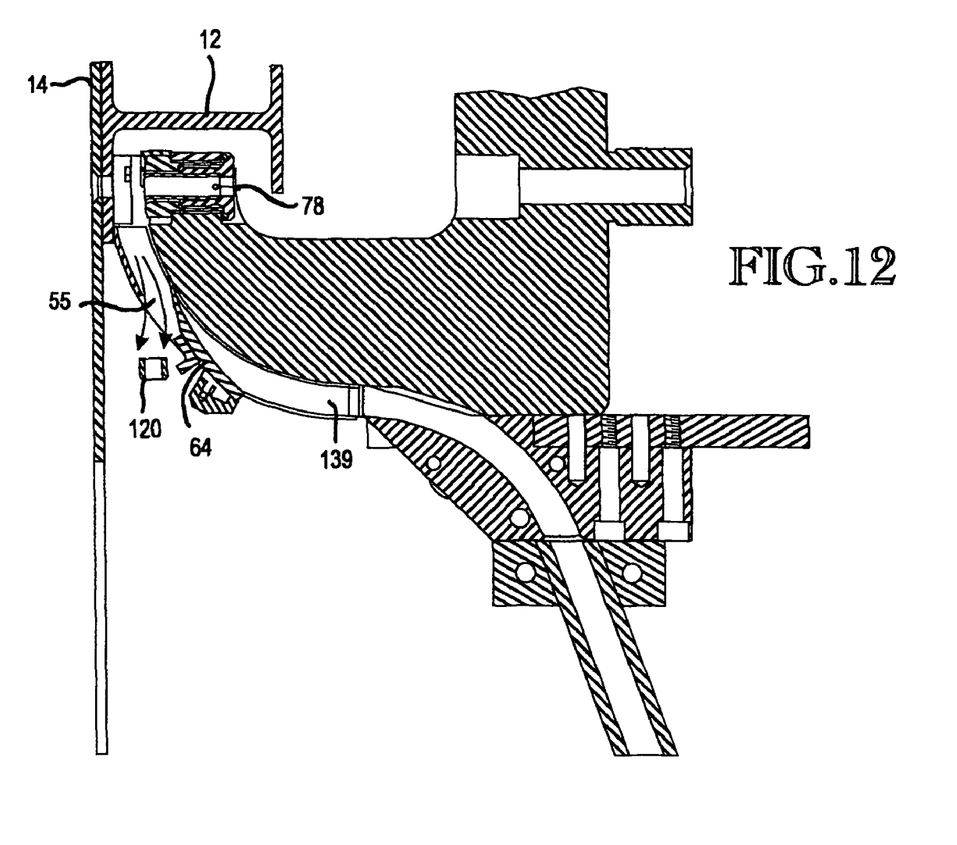
FIG. 12 is a cross-sectional view showing the exit of a defective collar from the collar feed apparatus.
Figure 13:
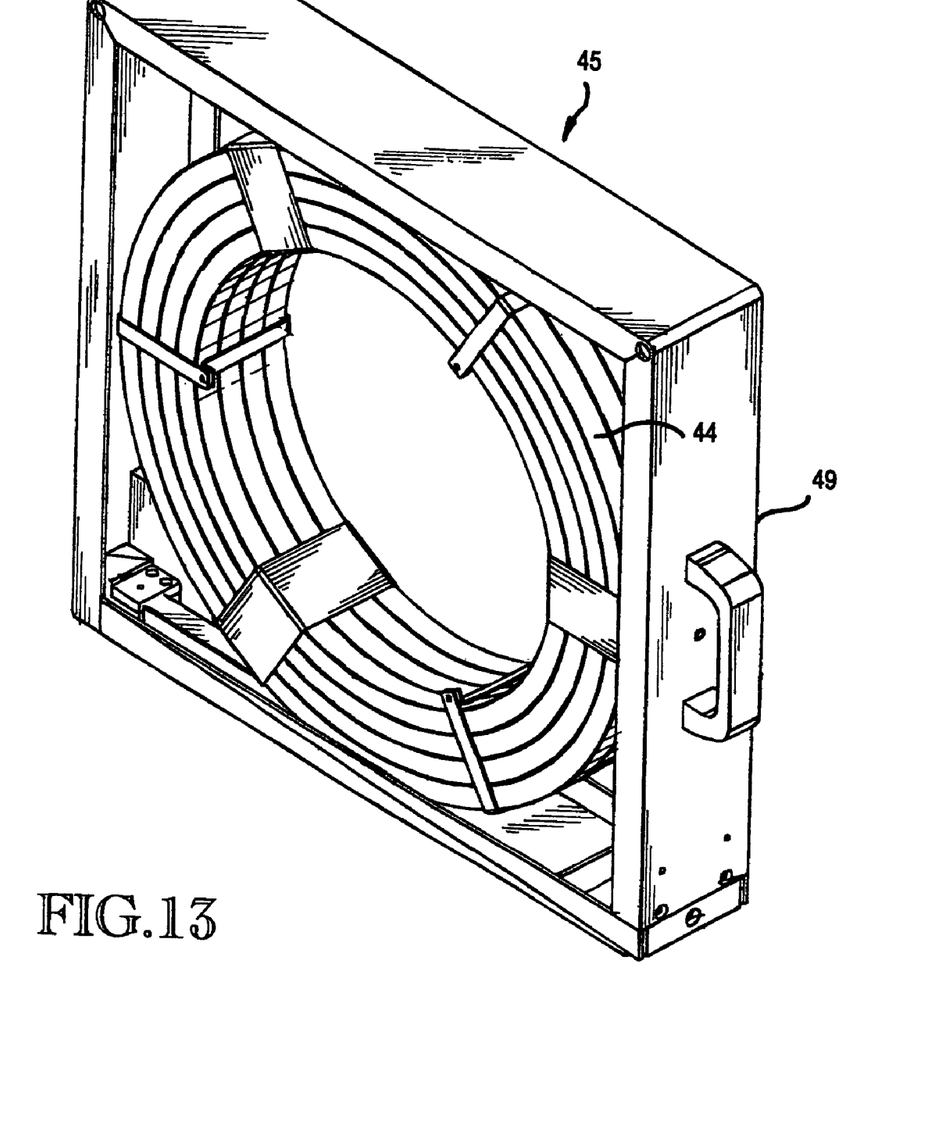
FIG. 13 is a perspective view of a collar cartridge.

FIG. 12 shows an optional feature which operates when a collar 120 is damaged or incorrectly presented, and thus needs to be removed. The surface configuration of element 12 prevents blowing the collar out between the clamp pads. Without unclamping, a trap door 64 is opened (inwardly into the feedpath cavity 39) and the ram assembly is moved back to provide proper clearance for removal of the collar. Compressed air is introduced at the head end of the collar feedpath, as shown by the arrows, and the damaged collar 120 is blown out of the feedpath through opening 55 between collar tracks 52 and 54 provided by the open trap door. The trap door is then moved back to its closed position, closing opening 55. Another collar can then be fed to the ram assembly along the feedpath 39. This arrangement prevents delays in removing damaged or improperly fed collars in a collar feed system and is another significant advantage of the system shown herein.

Hence, a new collar feed system has been described for use with automatic collar/bolt attachment systems. The system is arranged so that the collar is fed sideways through a collar feed path and presented to a sleeve portion mounted on a swaging die, which is supported in a manner which permits a slight lateral movement of the die. This results in a desired alignment between the bolt, the collar and the collar die as the bolt is driven through the opening in the workpieces and then the collar.

Although a preferred embodiment of the invention is disclosed here for the purposes of illustration, it should be understood that various changes, modifications and substitutions can be incorporated in the invention without departing from the spirit of the invention, which is defined by the claims which follow.

What is claimed is:

1. A collar swaging system for use with fasteners in the manufacture of large mechanical assemblies, in which collars are transported to a collar swaging die, comprising:
   a gripperless receiving element at the collar swaging die for stopping but not gripping the transported collar, the collar being held against the receiving element by compressed air, wherein the swaging die is mounted in a separate ram assembly such that the swaging die is moveable longitudinally toward the workpiece by action of the ram assembly and also slightly laterally, independent of the ram assembly, approximately 90° relative to the die's longitudinal movement, such that when the collar is positioned against a workpiece by movement of the swaging die by the ram assembly and a fastener is thereafter moved into the positioned collar through an opening in the workpiece, the resulting action of the fastener on the collar causes the collar and the die but not the ram assembly to move laterally into alignment with the fastener such that the centerlines of the fastener, the collar and the die are aligned.

2. The collar swaging system of claim 1, wherein pressure of the swaging die against the collar to the workpiece prevents pivoting of the collar relative to the longitudinal axis of the fastener.

3. The collar swaging system of claim 1, including an alignment element which frictionally prevents lateral movement of the swaging die away from said alignment during successive attachment operations of moving a fastener onto a collar at successive locations along a workpiece, so as to produce reliable swaging of collars onto fasteners at the successive locations.

4. The collar swaging system of claim 3, wherein the alignment element is an O-ring positioned at a lower end of the swaging die, and wherein the lateral movement of the die initially permitted results in alignment of the centerline of the, the collar and the centerline of the swaging die.

5. The collar swaging system of claim 1, wherein the receiving element is a soft plastic material, mounted to the periphery of the swaging die and having a V-shaped notch in a forward face thereof for contacting the external surface of the collar received there, wherein the receiving element has such a thickness and is otherwise constructed and arranged so as to not interfere with the action of the swaging die as it swages the collar onto the end of the fastener.

6. The collar swaging system of claim 1, including a spring member positioned within the swaging die toward the workpiece, such that a front face of the spring member is flush with a front face of the swaging die, tending to prevent the collar from rotating before the collar is moved against the workpiece.

7. The collar swaging system of claim 1, wherein the fastener is a bolt.

* * * * *

UNITED STATES PATENT AND TRADEMARK OFFICE
CERTIFICATE OF CORRECTION

| | | |
|---|---|---|
| PATENT NO. | : 7,954,218 B2 | Page 1 of 1 |
| APPLICATION NO. | : 11/332192 | |
| DATED | : June 7, 2011 | |
| INVENTOR(S) | : Scott C. Tomchick, Peter B. Zieve and Carter L. Boad | |

It is certified that error appears in the above-identified patent and that said Letters Patent is hereby corrected as shown below:

Claim 4, Col. 9, line 1, should read; --initially permitted results in alignment of the centerline of the fastener--

Signed and Sealed this
Fifteenth Day of November, 2011

David J. Kappos
*Director of the United States Patent and Trademark Office*